Jan. 2, 1962 H. A. HEDLAND ETAL 3,015,341
FLOW REGULATORS
Filed Jan. 10. 1958 2 Sheets-Sheet 1
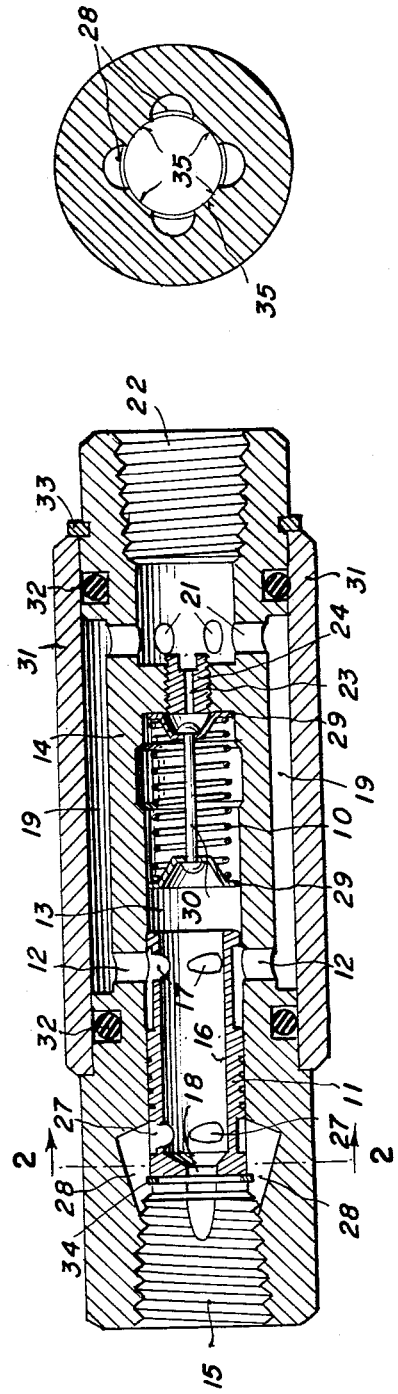
INVENTORS
HARRY A. HEDLAND
PAUL M. WATERMAN
BY
Roland C Rehm
ATTORNEY Jan. 2, 1962  H. A. HEDLAND ETAL  3,015,341
FLOW REGULATORS
Filed Jan. 10. 1958  2 Sheets-Sheet 2

INVENTORS
HARRY A. HEDLAND
PAUL M. WATERMAN
BY
Roland C. Rehm
ATTORNEY 3,015,341
FLOW REGULATORS
Harry A. Hedland, Evanston, and Paul M. Waterman, Glenview, Ill., assignors to William Waterman, Evanston, Ill.
Filed Jan. 10, 1958, Ser. No. 708,215
5 Claims. (Cl. 137—493)

This invention relates to flow regulators.

Flow regulators of the kind here involved control hydraulic flow to maintain a predetermined (usually constant) rate of flow despite variations in pressure, etc. The present flow regulator embodies simple means for permitting return or reverse flow at an unregulated rate and particularly at a rate substantially greater than maximum normal or regulated flow. This is accomplished in a simple construction without complex by-pass and check valve means.

The invention may be readily understood by reference to regulator constructions embodying the invention and shown in the accompanying drawings.

In said drawings:

FIG. 1 is a longitudinal section of a regulator;

FIG. 2 is a cross section on the plane 2—2 of FIG. 1;

FIG. 3 is a longitudinal section showing a different construction;

Figure 4:
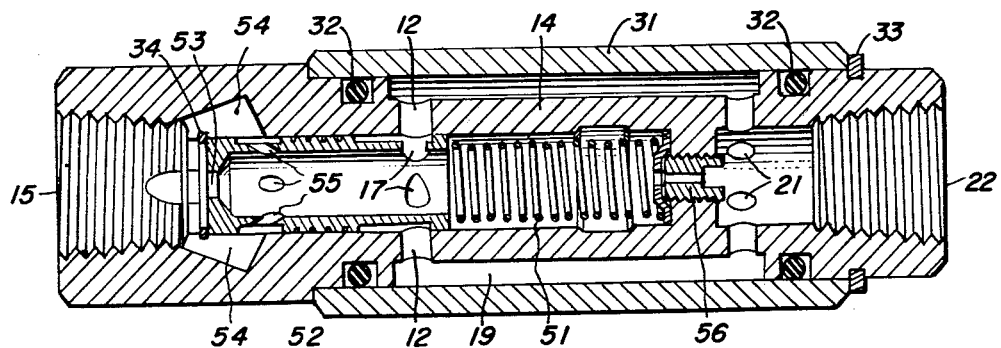
FIG. 4 is a longitudinal section of another illustrative construction.

Flow is regulated in the illustrative device by a resilient member which is deflected by and in response to pressure to control a throttling valve which regulates flow. The latter is arranged also to be responsive to return or reverse flow and to be moved thereby to a position which permits unrestricted return or reverse flow, preferably at a rate which may if necessary be greater than maximum normal or forward flow.

Referring to the device shown in FIGS. 1 and 2, the resilient member is shown in the form of a spring 10 against which the throttling piston 11 acts to throttle flow through a port or ports 12. Spring 10 and piston 11 are located in and the latter is slidable in the cylindrical bore 13 of regulator housing 14.

Piston 11 is provided with a skirt 16 adapted to bear against spring 10 and variably to throttle ports 12. In the present instance, the skirt is provided with openings 17 adapted variably to register with ports 12, the latter being throttled by the trailing edge of ports 17 to the extent determined by spring 10 in response to the fluid force on piston 11. The latter force is developed by a relatively large metering orifice 18 developing a relatively small pressure drop, which nevertheless is sufficient to deflect spring 10 responsively to fluid pressure (actually to the difference between upstream and downstream pressures), and thereby variably to throttle ports 12 to maintain a predetermined rate of flow (generally a constant rate of flow). Ports 12 and 17 are made large enough so that when in register and fully opened (as occurs on reverse flow as presently explained) reverse flow may pass through them without restriction.

From ports 12, flow travels through an annular passage 19 around regulator housing 14 and through ports 21 at the opposite end of the housing; and thence to outlet 22. The latter is advantageously threaded similarly to inlet 15, for coupling in a line.

To adapt the regulator to a wider range of regulated flow rates, an adjusted proportion of the flow may be permitted to by-pass ports 12. In the present instance, the by-passed flow travels through bore 13 and out metering by-pass orifice 23, to join the flow from ports 21. By-pass orifice 23 is advantageously adjustable in size, in this case by placing it in a removable screw plug 24 which may be changed to provide orifices of different sizes depending on the desired operation of the regulator.

Figure 5:
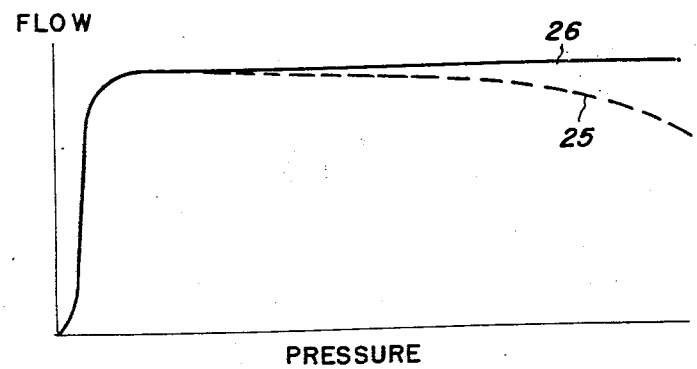
FIG. 5 is a diagram illustrating the improved regulation obtained by a by-pass orifice.

Orifice 23 is also advantageously used to correct faulty regulation as illustrated in FIG. 5. In regulators of this type there is a high velocity created adjacent the lower face of the piston 11; this can result in a low pressure area of sufficient magnitude to modify the intended force relationship between orifice pressure drop and spring force and result in a flow curve which droops, as shown by the dotted line 25. This may be corrected as in this case, by passing a portion of the fluid through a by-pass orifice represented by the orifice 23 separate from the regulating means. This by-pass orifice should be of sufficient size to supplement the regulated flow and give an aggregate rate of flow which will be substantially uniform as represented by the solid line 26. In other words, flow through the by-pass port supplements that through throttled ports 12 at a rate to result in a substantially uniform rate of flow independently of pressure.

As here shown in the fully retracted position (the position assumed for reverse flow), ports 17 not only register fully with ports 12, but supplemental discharge ports 27 are in register with supplemental discharge passages 28 in the regulator housing (see also FIG. 2). Thus in addition to the metering orifice 18, reverse flow may also pass through the supplemental discharge ports 27. The latter ports are closed however, immediately upon resumption of normal or forward flow, for the latter immediately moves the piston forward to close ports 27 and into throttling relation with ports 12. In the illustrative device of FIG. 1, this forward movement of the piston may take place freely and instantly on resumption of forward flow, for spring 10 is in this instance limited in its effective length or freedom to expand (being in this instance somewhat compressed) so that the piston is initially out of operative contact with spring 10 by a distance sufficient to permit free and unrestricted movement of the piston to operative or throttling position. As here shown the ends of spring 10 are carried in spring seats 29 and the spring is held in pre-compressed condition by a tie rod 30. The spring seats 29 provide sufficient clearance in the bore 13 to permit flow to pass to orifice 23.

The degree of pre-compression or pre-stressing is important only as it affects the operating characteristics of the spring. These can be somewhat adjusted by screw plug 24, which is advantageously provided with means for adjusting it axially (in this case by a screw driver slot).

The annular passage 19 is enclosed by a shell or sleeve 31 outside of and enclosing passage 19. Its ends are sealed by O-ring packing 32 located in enlarged portions of the housing. A snap ring 33 holds the sleeve against displacement. Another snap ring 34 limits the outward movement of the piston on reverse flow and serves to register the piston ports 27 with discharge passages 28. The latter are advantageously milled in the inlet 15 at spaced points to leave lands 35 for piston 11 and for the groove in which snap ring 34 is seated (FIG. 2).

The above described device embodies in a single simple unit means for permitting return flow at a substantially greater rate than normal flow without separate return passages controlled by a check valve.

As illustrated in FIG. 3, a dash-pot may be added to damp out oscillations of spring and piston under certain conditions. In this instance the spring 41 is limited by a tubular tie 42 which provides a passage for flow to by-pass through orifice 43. This orifice is here shown formed in the end 44 of the housing, but it may be incorporated in a threaded plug like the plug 24 in FIG. 1. The movable spring seat 45 to which tie 43 is connected, is here shown in the form of a dash-pot piston which constitutes with the bore, a dash-pot to damp out oscillations of spring and piston. There is sufficient clearance between the dash pot piston and the wall of the bore to permit the restricted back-and-forth flow involved in dash pot action. In other respects the regulator shown in FIG. 3 is generally like that illustrated in FIGS. 1 and 2.

In FIG. 4 is illustrated a regulator in which the spring 51 is not limited but is in engagement with piston valve 52 in its retracted or reverse flow position. In this regulator there is an instant at the start of normal or forward flow, when the flow besides passing through metering orifice 53, also enters the regulator through the then open discharge passages 54 similar to passages 23 in the regulator of FIGS. 1 and 2. To assist in moving the piston to throttling position where the aforesaid discharge passages are closed to the entrance of flow, the reverse flow passages 55 are inclined as shown to provide a component of force on the piston in the direction of flow to aid in moving the piston forward immediately sufficiently to cut off flow through passages 54. The pressure drop which then develops at the metering orifice 53 is then balanced by operative deflection of spring 51. The latter in its fully extended position shown in FIG. 4 offers relatively small resistance to movement of the piston under the aforesaid component of force created by flow, with the result that unregulated flow is only momentary, and the piston promptly assumes its throttling position.

A threaded by-pass plug 56 like plug 24 in FIG. 1 is advantageously provided to permit the adjustment referred to in connection with the regulator of FIG. 1.

It should be understood that various changes in details may be made without altering the principle of operation above described, particularly with reference to details involving simplification of machining and assembly operations. Obviously the invention is not limited to the details of the illustrative devices herein described, since these may be variously modified. Moreover it is not indispensable that all features of the invention be used conjointly, since various features may be used to advantage in different combinations and sub-combinations.

Having described our invention, we claim:

1. A flow regulator comprising in combination a housing having a cylindrical bore therein and terminal connections communicating with said bore to adapt the same for connection in a fluid line, a piston valve slidable in said bore in response to flow through said bore, throttling ports in said bore adapted to be variably throttled by movement of said piston during normal flow in response to variations in fluid pressure, an orifice in said piston adjacent one end of said bore to create a pressure drop to actuate said piston, a spring adjacent the other end of said bore to balance the pressure drop force against said piston, supplemental return flow ports in said bore by-passing said orifice closed by movement of said piston during normal flow through, said bore being longer than the length to accommodate throttling movement of said piston by a distance equivalent to the movement of the piston to open and close said supplemental ports, said additional length being located up-stream of said throttling ports whereby initial movement of said piston during normal flow cuts off said supplemental ports before throttling said throttling ports.

2. A regulator comprising in combination a housing having a cylindrical bore therein and terminal connections communicating with said bore to adapt the housing for connection in a fluid line, a piston valve slidable in said bore in response to and in the direction of flow through said bore, a substantially large metering orifice in said piston adjacent the inlet terminal for creating a small pressure drop in normal flow to create a force for actuating said piston without substantially restricting flow, throttling ports in said bore adapted to be throttled by movement of said piston in response to normal or forward flow through said bore, a spring for balancing the force on said piston to effect throttling of said ports in response to variations of fluid pressure, said bore having additional length up-stream of the throttling position of said piston, and said piston being movable by normal flow through said additional length before it reaches throttling position, supplemental ports in said piston and in said bore in said additional length adapted to register when said piston is up-stream of its throttling position, said supplemental ports being closed and out of register when said piston moves to throttling position, said supplemental ports in said bore by-passing said orifice to permit unrestricted reverse flow through said bore.

3. A flow regulator comprising in combination a housing having a cylindrical bore therein for fluid flow and terminal connections at each end communicating with said bore to adapt the housing for connection in a fluid line, a piston valve slidable in said bore in response to flow through said bore, a relatively large orifice in said piston adjacent the inlet terminal for creating a relatively small pressure drop to create the force sufficient for actuating said piston, throttling ports in said bore adapted to be throttled by said piston in response to normal or forward flow through said bore, a spring for balancing the force on said piston to effect throttling of said ports in response to variations of fluid pressure, said bore having supplemental ports adjacent and by-passing said orifice and up-stream of said throttling ports, said supplemental ports being controlled by said piston and being uncovered and fully opened by said piston when the latter is at the upstream end of said bore, said spring being limited in length to limit its operative engagement with said piston to allow the latter free forward movement independent of said spring from the position where said supplemental ports are fully opened to a position in operative throttling relation to said spring and said throttling ports, and said bore having a length to accommodate the throttling movement of said piston plus additional length equivalent to said free forward movement, whereby said supplemental ports are closed before said piston throttles said throttling ports.

4. A flow regulator comprising in combination a housing having a cylindrical bore therein and terminal connections communicating with said bore to adapt the same for connection in a fluid line, a piston valve slidable in said bore in response to flow through said bore, a throttling port in said bore adapted to be variably throttled by said piston in response to variations in fluid pressure, an orifice in said piston adjacent one end of said bore to create a pressure drop to actuate said piston, a spring adjacent the other end of said bore to balance the pressure drop force against said piston, supplemental return flow in said bore and said piston adjacent the up-stream end of said bore and uncovered by said piston and placed in communication with flow through said bore when said piston is at the up-stream end of said bore, thereby to permit reverse flow through said housing without restriction by said orifice, said bore being longer between its said supplemental port and said throttling port than the distance between the piston supplemental port and the throttling port of said piston so that said supplemental ports are out of register when said piston moves down-stream to throttling position in response to normal flow.

5. A flow regulator comprising in combination a housing having a cylindrical bore therein and terminal connections communicating with said bore to adapt the same for connection in a fluid line, a piston valve slidable in said bore in response to flow through said bore, throttling ports in said bore adapted to be variably throttled by said piston in response to variations in fluid pressure, an orifice in said piston adjacent one end of said bore to create a pressure drop to actuate said piston, a spring adjacent the other end of said bore to balance the pressure drop force against said piston, supplemental return flow ports in said bore and piston adapted to register when said piston is moved by return flow to the up-stream end of said bore, thereby to permit reverse flow through said housing without restriction by said orifice, said piston being initially movable by normal flow a distance sufficient to move said supplemental ports in piston and bore out of register, and said bore being longer than the operative length of said piston by said distance, whereby said supplemental ports are moved out of register before said piston throttles said throttling ports.

References Cited in the file of this patent

UNITED STATES PATENTS

| | | |
|---|---|---|
| 375,070 | Jackson | Dec. 20, 1887 |
| 611,519 | Simmance | Sept. 27, 1893 |
| 1,156,011 | Kenney | Oct. 5, 1915 |
| 1,907,162 | Webb | May 2, 1933 |
| 2,198,487 | Sisk | Apr. 23, 1940 |
| 2,807,279 | Presnell | Sept. 24, 1957 |
| 2,833,362 | Martin | May 6, 1958 |
| 2,836,198 | McNeill | May 27, 1958 |
| 2,938,538 | Allen | May 31, 1960 |